(12) United States Patent
Brocklehurst (10) Patent No.: US 9,085,359 B2
(45) Date of Patent: Jul. 21, 2015

(54) ROTOR BLADE TIP PLANFORM

(75) Inventor: Alan Brocklehurst, Somerset (GB)

(73) Assignee: Agustawestland Limited, Somerset (GB)

(*) Notice: Subject to any disclaimer, the term of this patent is extended or adjusted under 35 U.S.C. 154(b) by 562 days.

(21) Appl. No.: 13/307,666

(22) Filed: Nov. 30, 2011

(65) Prior Publication Data

US 2012/0237354 A1 Sep. 20, 2012

(30) Foreign Application Priority Data

Dec. 2, 2010 (GB) .................................. 1020426.1

(51) Int. Cl.
*B64C 27/46* (2006.01)

(52) U.S. Cl.
CPC ......... *B64C 27/463* (2013.01); *Y10T 29/49332* (2015.01)

(58) Field of Classification Search
CPC .................................................. B64C 27/463
USPC ...................... 416/228, 241 R, 242
See application file for complete search history.

(56) References Cited

U.S. PATENT DOCUMENTS

| | | | |
|---|---|---|---|
| 4,880,355 A | 11/1989 | Vuillet et al. | |
| 4,975,022 A | 12/1990 | Perry | |
| 5,246,344 A | 9/1993 | Perry | |
| 6,190,132 B1 * | 2/2001 | Yamakawa et al. | 416/228 |
| 6,231,308 B1 * | 5/2001 | Kondo et al. | 416/228 |
| 7,513,750 B2 * | 4/2009 | Moffitt et al. | 416/228 |
| 7,946,826 B1 * | 5/2011 | Koegler et al. | 416/238 |
| 2009/0319224 A1 * | 12/2009 | Jackson et al. | 702/167 |
| 2010/0181432 A1 | 7/2010 | Gratzer | |

FOREIGN PATENT DOCUMENTS

| | | |
|---|---|---|
| CN | 101769266 | 3/2010 |
| EP | 2 228 299 | 9/2010 |
| JP | 1016498 | 7/1987 |

OTHER PUBLICATIONS

"Bezier Curve Fitting Method for Existing Turbine Blade Design" by Daniel Karpowitz, Journal of Applied Engineering Mathematics vol. 3, 2005.*
"A compact Parameterization for Shape Optimization of Aerofoils" by Damir Vucina et al., Proceedings of the World Congress on Engineering vol. 1, 2008.*
"Mak 112E-4 Computer Aided Technical Drawing: Surface modeling" by Dr. C. Erdem, 2002.*
Search Report issued Mar. 30, 2011 for GB1020426.1, Intellectual Property Office, South Wales, United Kingdom.

(Continued)

*Primary Examiner* — Nathan Wiehe
*Assistant Examiner* — Kayla McCaffrey
(74) *Attorney, Agent, or Firm* — Marvin Petry; Stites & Harbison PLLC (57) ABSTRACT

An aerofoil has a main portion of aerofoil cross section, an inner spanwise root end where the aerofoil is in use secured to a supporting structure, and at an outermost spanwise end outboard of the main portion, beyond a tip station, a tip region which includes a tip edge. The planform configuration of the tip edge lies on a first Bezier curve constructed from at least four control points, P1, P2, P3 and P4, each lying on the periphery of a polygon which bounds the tip region. Control point P1 is located on a leading edge of the aerofoil. Control point P2 is located on the second side of the polygon. Control point P3 is located on the third side of the polygon, and control point P4 is located at the outermost tip edge point at a trailing edge of the aerofoil.

31 Claims, 5 Drawing Sheets

(56) References Cited

OTHER PUBLICATIONS

Vucina, Damir, et al., "A Compact Parameterization for Shape Optimization of Aerofoils", Jul. 4, 2008, 6 pages, vol. I, Proceedings of the World Congress on Engineering.

Karpowitz, Daniel, "Bézier Curve Fitting Method for Existing Turbine Blade Design", Apr. 2005, pp. 1-4, vol. 3, Journal of Applied Engineering Mathematics.

* cited by examiner

ROTOR BLADE TIP PLANFORM

This invention relates to an aerofoil and more particularly but not exclusively to a rotating aerofoil or rotor blade.

The invention has been developed specifically for a rotor blade of a helicopter, namely a rotor blade of an anti-torque rotor, or tail rotor, and a rotor blade of a main sustaining rotor system of an aircraft, but the invention may be applied to other aerofoils, for example only, a wind turbine blade.

According to a first aspect of the invention we provide an aerofoil having a main portion of aerofoil cross section, an inner spanwise root end where the aerofoil is in use secured to a supporting structure, and at an outermost spanwise end outboard of the main portion, beyond a tip station, a tip region, and the tip region including a tip edge, the planform configuration of the tip edge lying on a first Bezier curve constructed from at least four control points P1, P2, P3 and P4, the control points P1, P2, P3 and P4 each lying on the periphery of a polygon which bounds the tip region, Bezier control point P1 being located on a leading edge of the aerofoil at the tip station, which is at a spanwise position between 93.5% R and 95.9% R, where first and second sides of the polygon meet, the first side being at the tip station extending perpendicularly to a blade reference axis, which extends spanwise of the main portion of the aerofoil, and the second side being a tangent to the leading edge of the aerofoil at control point P1, which extends between control point P1 to a position where the second side meets a third side of the boundary polygon at a position outwardly of the tip edge, the third side being parallel to the first side and extending between the position where the third side meets the second side, to where the third side and a fourth side meet, control point P2 being located on the second side at a position between 30% and 80% along the second side from P1, control point P3 being located on the third side at a position between 30% and 90% along the third side from where the second and third sides meet, and control point P4 being located at the outermost tip edge point at a trailing edge of the aerofoil, where R is the effective aerofoil span.

In the case of a fixed aerofoil, the effective aerofoil span R is the distance from the root end to the outermost tip edge point. Whereas in the case of a rotating aerofoil such as a rotor blade, the swept diameter of the rotating system is sometimes referred to as the span, in this specification where the aerofoil is referred to as a rotating aerofoil such as a rotor blade, the effective aerofoil span is the swept radius from an axis of rotation adjacent the root end, to the outermost tip edge point.

The present invention facilitates the use of CAD software to design the tip edge configuration of an aerofoil. Benefits from any such tip edge shapes are also realised in forward (edgewise) flight where the stall boundary and compressibility boundaries which limit the load carrying capacity and speed of helicopters may be pushed back. Shaping the tip edge in the manner of the invention also provides an acoustic benefit.

Desirably, the Bezier curve on which the planform configuration of the tip edge lies, is a cubic Bezier curve defined by four control points. However a more complex Bezier curve may be constructed, which would require more than four control points.

Conveniently, the boundary polygon is a trapezium although another typically four-sided polygon may bound the tip region. In each case the outermost tip edge point, and thus the control point P4, may lie on the third side of the polygon, for example in one embodiment, where the third side meets the fourth side, or, in another embodiment, between control point P3 and where the third and fourth sides of the boundary polygon meet.

In one embodiment, the fourth side of the boundary polygon is a tangent to a trailing edge of the aerofoil where the first side meets the trailing edge, and the fourth side extending between where the first side meets the trailing edge and the fourth side meets the third side.

The second and fourth sides may, or need not be parallel.

The tip edge of the aerofoil may have a rounded leading edge corner which extends to an edge part which extends substantially streamwise, so that the tip edge is of a swept back configuration from the control point P1 on the leading edge at the tip station.

Preferably the planform configuration of the trailing edge of the aerofoil at the tip region lies on a second Bezier curve.

In one embodiment, for example applicable to a tail rotor, the planform configuration of the trailing edge of the aerofoil at the tip region lies on a second Bezier curve constructed from at least two further control points P5, and P8, control point P5 being located where the first side of the boundary polygon meets the trailing edge, and control point P8 being located at the outermost tip edge point.

Thus the second Bezier curve between the control points P5 and P8 may be a straight line which extends generally parallel to the blade reference axis.

In another embodiment the planform configuration of the trailing edge at the tip region is not a straight line, but is a curve constructed from three control points P5, P6 and P8, the control point P6 being located at the intersection of first and second trailing edge control point reference lines, the first trailing edge control point reference line being a tangent to the trailing edge inboard of the tip station, at control point P5, the first trailing edge control point reference line extending at a sweep angle to the blade reference axis, and the second trailing edge control point reference line being a line which passes though control point P8 at the outermost tip edge point and extends at an angle to the blade reference axis which is between zero and up to 1.5 times the sweep angle, and preferably between zero and the sweep angle.

In yet another embodiment, the second Bezier curve may be constructed from four control points P5, P6, P7 and P8, the control point P6 being located along a first trailing edge control point reference line which is a tangent to the trailing edge inboard of the tip station, at control point P5, the first trailing edge control point reference line extending at a sweep angle to the blade reference axis, and the control point P7 is located along a second trailing edge control point reference line being a line which passes through point P8 at the outermost tip edge point and extends at an angle to the blade reference axis which is between zero and up to 1.5 times the sweep angle, and preferably between zero and the sweep angle.

Thus the trailing edge of the aerofoil at the tip region lies, may, like the tip edge, lie on a cubic Bezier curve.

The control point P6 may be located along the first trailing edge control point reference line at a position between 10% and 33% of the spanwise extent of the tip region from control point P5 but desirably not spanwise outwardly of the intersection of the first and second trailing edge control point reference lines. The control point P7 may be located along the second trailing edge control point reference line at a position between 66% and 90% of the spanwise extent of the tip region from control point P5 but not spanwise inwardly of the intersection of the first and second trailing edge control point reference lines.

By constructing the first and second Bezier curves by locating the respective control points in the positions as defined, a tip region of an aerofoil may more readily be designed to have features desired for particular properties to be realised. Moreover changes to the tip region configuration, during parametric testing can readily be made.

For most rotating aerofoil applications, a sweep angle between zero and 30° is selected. For a tail rotor with a straight trailing edge the sweep angle may be zero, but for a rotor blade of a main sustaining rotor system, the sweep angle may be between 20° and 30° where the tip of the aerofoil is subject to high mach numbers.

For each of the embodiments described, if desired the tip region of the aerofoil may have anhedral.

Typically an aerofoil has a chordal plane which extends over the aerofoil between the leading edge and the trailing edge at least over the main portion of the aerofoil. The anhedral may follow a curve in a vertical plane which is perpendicular to the chordal plane, the curve being between pressure and suction surfaces of the aerofoil over the tip region. The curve may be a third Bezier curve constructed from at least three control points P9, P10, and P12 in the vertical plane. The control point P9 may be located spanwise of the aerofoil at the tip station, and on the chordal plane, whilst control point P12 may be located at the outermost tip edge point, and intermediate control point P10 being located at the intersection of first and second anhedral control point reference lines, the first anhedral control point reference line being coincident with the chordal plane, and the second anhedral control point reference line passing through control point P12 and extending at a tip anhedral angle to the chordal plane, at between 4° and 30°.

In another example though, the curve followed by the anhedral is a third Bezier curve constructed from at least four control points P9, P10, P11 and P12 in the vertical plane. The control point P9 may be located spanwise of the aerofoil at the tip station, and on the chordal plane, whilst control point P12 may be located at the outermost tip edge, with first intermediate control point P10 being located along a first anhedral control point reference line which is coincident with the chordal plane, and a second intermediate control point P11 being located on a second anhedral control point reference line which passes through control point P12 and extends at a tip anhedral angle to the chordal plane, at between 4° and 30°.

In the latter case, the first intermediate control point P10 may be located along the first anhedral control point reference line at a position between 20% and 55% of the spanwise extent of the tip region from control point P9, but not spanwise outwardly of the intersection of the first and second anhedral control point reference lines, and the second intermediate control point P11 is located along the second anhedral control point reference line at a position between 55% and 90% of the spanwise extent of the tip region from control point P9 but not spanwise inwardly of the intersection of the first and second anhedral control point reference lines.

More specifically, preferably the first intermediate control point P10 is located along the first anhedral control point reference line at a position at about 33% of the spanwise extent of the tip region from control point P9, and the second intermediate control point P11 is located along the second anhedral control point reference line at a position at about 66% of the spanwise extent of the tip region from control point P9.

Although the degree of anhedral i.e. the tip anhedral angle may be chosen as required, typically the anhedral angle is between 4.4° and 25°.

It will be appreciated that particularly but not exclusively for a helicopter tail or main sustaining rotor blade, the tip region will extend spanwise for a relatively minor proportion of the overall effective span, For example the main portion of the aerofoil may extend from the supporting structure spanwise for at least 75% of the overall aerofoil effective span.

The blade reference axis which extends spanwise of the main portion of the aerofoil is typically mid the mean thickness of the main portion of the aerofoil. If required, at least the main portion of the aerofoil has a twist of between 0° and 16° therealong about the blade reference axis.

Although an aerofoil in accordance with the invention may be a fixed aerofoil, by which we mean an aerofoil which does not rotate relative to a supporting structure such as an aircraft fuselage, the invention is particularly applicable where the aerofoil is secured at the root end to a rotating supporting structure, e.g. is a rotor blade for a helicopter.

In each case though the aerofoil may include a tip panel located between the main portion of the aerofoil and the tip region, the tip panel extending outwardly spanwise from a tip panel station at between 85% R and 88% R to the tip station.

Where the blade reference axis is located at 0.25C where C is the chord length of the main portion of the aerofoil, and where the tip panel has a leading edge which sweeps rearwardly from the tip panel station to the tip station, the leading edge of the aerofoil at the tip station may be located at or rearwardly of where the blade reference axis intersects the leading edge.

Between the tip panel and the main portion of the aerofoil there may be a blend region at which leading and trailing edges of the main portion blend with respective leading and trailing edges of the tip panel, the blend region extending outwardly spanwise from a blend region station at about 75% R to the tip panel station. At least portions of the leading edges of each of the blend region and the tip panel may if desired, extend forwardly of the leading edge of the main portion of the aerofoil.

Desirably at least portions of the leading edges of each of the blend region and tip panel lie on one or more Bezier curves constructed from control points.

According to a second aspect of the invention we provide a method of providing an aerofoil which includes a main portion of aerofoil cross section, an inner spanwise root end where the aerofoil is in use secured to a supporting structure, and at an outermost spanwise end outboard of the main portion, beyond a tip station, a tip region, and the tip region including a tip edge, the planform configuration of the tip edge lying on a first Bezier curve constructed from at least four control points P1, P2, P3 and P4, the control points P1, P2, P3 and P4 each lying on the periphery of a polygon which bounds the tip region, Bezier control point P1 being located on a leading edge of the aerofoil at the tip station, which is at a spanwise position between 93.5% R and 95.9% R, where first and second sides of the polygon meet, the first side being at the tip station extending perpendicularly to a reference axis which extends spanwise of the main portion of the aerofoil, and the second side being a tangent to the leading edge of the aerofoil at control point P1, which extends between control point P1 to a position where the second side meets a third side of the boundary polygon at a position outwardly of the tip edge, the third side being parallel to the first side and extending between the position where the third side meets the second side, to where the third side and a fourth side meet, control point P2 being located on the second side at a position between 30% and 80% along the second side from P1, control point P3 being located on the third side at a position between 30% and 90% along the third side from P2, and control point P4 being located at the outermost tip edge point at a trailing edge of the aerofoil, where R is the effective aerofoil span, the method including shaping the planform configuration of the tip edge to follow the first Bezier curve.

The method of the second aspect of the invention may include providing any of the features of the aerofoil of the first aspect of the invention.

Embodiments of the invention will now be described with reference to the accompanying drawings in which:—

Figure 1:
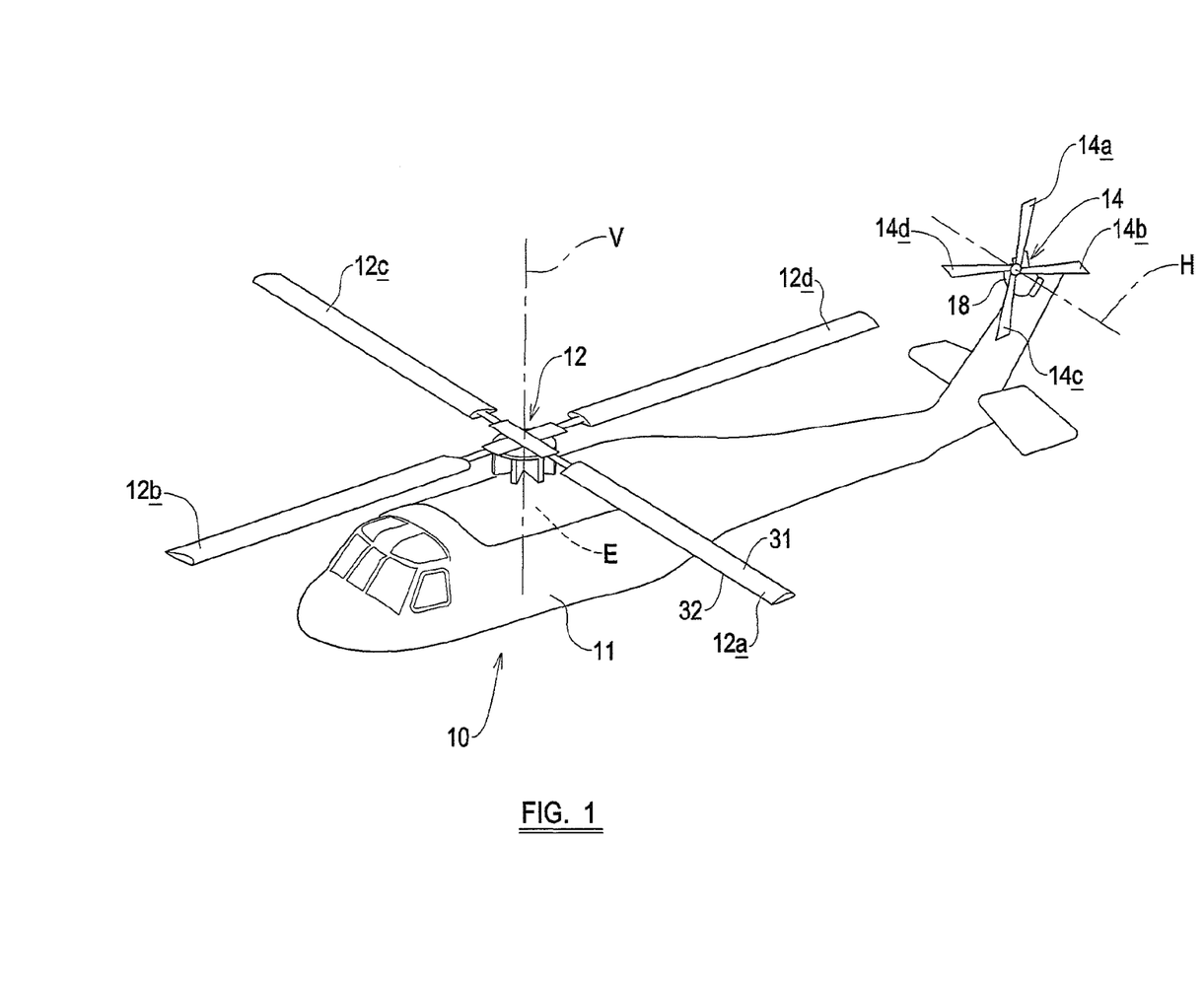
FIG. 1 is an illustrative view of a helicopter which has an anti-torque tail rotor system including a four aerofoil rotor blades each in accordance with the invention, and a main sustaining rotor system including four aerofoil rotor blades each in accordance with the invention.

Referring to FIG. 1 of the drawings a helicopter 10 includes a body 11, which mounts a main sustaining rotor system 12 which includes a plurality of aerofoil rotor blades 12a, 12b 12c, 12d, four in this example, which rotate about a first, generally upright, rotary axis V, to effect lift, and an anti-torque or tail, rotor system 14 which includes four aerofoil rotor blades 14a, 14b, 14c, 14d which rotate about a second, generally horizontal, rotary axis H.

The invention may be applied to the rotor blades 12a, 12b, 12c, 12d of the main sustaining rotor system 12 as will be described below with particular reference to FIG. 7 but will first be described in relation to a rotor blade 14a of the anti-torque tail rotor system 14.

Referring to FIGS. 2 to 5 it can be seen that the rotor blade 14a is of aerofoil cross section over at least a main portion 16 of the blade 14a, which is spanwise between an inner root end 17 and a tip region 20. At the inner root end 17 the blade 14a is secured to a supporting structure 18 which in use, is rotated about axis H by a power unit, such as an engine E of the helicopter 10, via a suitable transmission, as is well known in the art.

Figure 5:
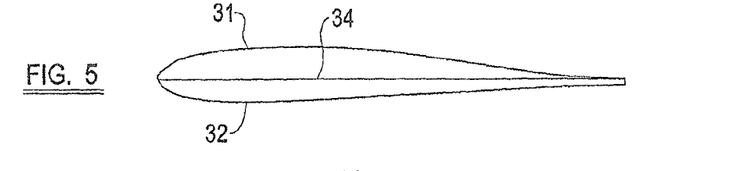
FIG. 5 is a cross sectional view along the line A-A of FIG. 3, showing the aerofoil cross section of a central portion of the rotor blade.
Figure 6:
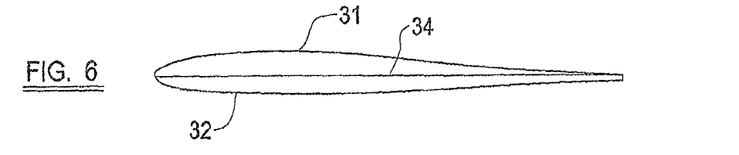
FIG. 6 is a cross sectional view along the line B-B of FIG. 3, showing the aerofoil cross section where the central portion and tip of the rotor blade meet.

The camber of the aerofoil cross section is generally constant over the main portion 16 of the blade 14a as illustrated in FIG. 5, but towards the tip region 20 of the blade 14a, the camber reduces, as illustrated in FIGS. 5 and 6. FIG. 6 illustrates, in cross section, the camber at a position where the main portion 16 and tip region 20 meet i.e. at a tip station indicated by the line B-B in FIG. 3.

Figure 4:
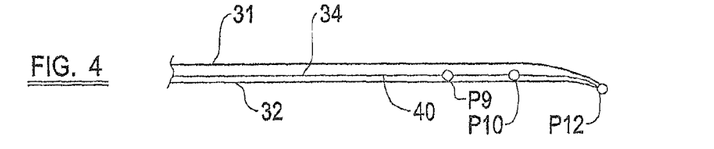
FIG. 4 is a rear view of the outer end of the rotor blade of FIG. 2.

FIG. 4 shows that at the spanwise outboard end of the blade 14a i.e. the tip region 20, the thickness of the aerofoil blade 14a, reduces to a minimum.

The main portion 16 aerofoil configuration in the example, is designed to provide high lift at mid-subsonic Mach numbers, and the constant aerofoil cross section of main portion 16 extends spanwise of the blade 14a, to a position about 87% along the blade 14a in this example, which is a position close to where the peak blade loading is generated. In the example where the invention is applied to an aerofoil 10 which is a rotor blade 14a of a tail rotor system 14, this position equates to about 87% R, where R is the effective aerofoil span, namely in this example, the swept radius from the rotational axis H to an outermost tip edge point 33 of the blade 14a. Spanwise outwardly from 87% R, the aerofoil camber reduces, towards and over the tip region 20.

In the example, the main portion 16 and the tip region 20 meet at a position referred to as the tip station (line B-B) which is at about 94% R.

The rotor blade 14a, at least along the main portion 16, has a chord C between a leading edge 25 of the blade 14a, and a trailing edge 26 of the blade 14a over the main portion 16 of the blade 14a, along a chordal plane 34 which is between suction 31 and pressure 32 surfaces of the aerofoil 14a. The chord C in this example has a length of about R/5.409091, i.e. the tip region 20 extends spanwise for 32.45% chord. Thus the radial location where the main portion 16 and the tip region 20 meet, i.e. the tip station B-B, can also be expressed as at about 6% R width from the outermost tip edge point 33 which is at about 100% R.

In another example though, a different relationship between R and C may prevail. The span of the tip region 20 instead of being 6% R, may vary from about 20% C to 35% C or even more for another kind of aerofoil, e.g. up to 50% C.

Although this is not easily evident from the drawings, the rotor blade 14a has some twist along a spanwise extending blade reference axis L which extending longitudinally of the main portion 16 of the blade 14a. The blade reference axis L is a radial line (if there is no chordwise lag-offset) and is usually located at ¼ C and mid the mean thickness of the aerofoil section over the main portion 16 of the blade 12a. The provision of such twist means that the tip region 20 is more "nose down" than the root end 17. However in the example, this twist does not extend over the entire span of the blade 14a, but only up to about 94% R i.e. up to the tip station B-B where the main portion 16 and the tip region 20 meet.

The amount of twist may be anything between 0° and 16° about the blade reference axis L, and more preferably between 0° and 12°, and in the example, about 8°.

The leading edge 25 of the rotor blade 14a extends from the root end 17 to the tip region 20, and the trailing edge 26 in the example, extends straight from the root end 17 over the entire span of the blade 14a to the outermost tip edge point 33. The tip region 20 has at its outboard end, a tip edge 28 which extends from the tip station B-B on the leading edge 25, where the main portion 16 and tip region 20 meet, to the outermost tip edge point 33 of the trailing edge 26 of the blade 14a.

The tip edge 28 has a forward leading edge corner 29 which extends from the tip station B-B on the leading edge 25 where the main portion 16 and the tip region 20 meet. The forward leading edge corner 29 is rounded and smoothly blended. Thus the tip edge 28 is rounded, and sweeps back through the leading edge corner 29 to a near streamwise edge part 30, to the outermost tip edge point 33 of the blade 14a. The tangency of this near streamwise edge part 30 may be orthogonal to the blade reference, axis L, or may retain a desired sweep to a swept outermost tip edge point 33, to maximise acoustic benefits.

The tip region 20 design for a tail rotor 14a application, for example in the embodiment described with reference to FIGS. 2 to 5, is a compromise between high pitch at mid Mach numbers in hover and low speed flight, and lower incidence, higher mach number conditions on the advancing blade. The tip region 20 shape of the blade 14a of the embodiment offers a good compromise between the varying requirements. In the former case, the design of the forward leading edge corner 29, by appropriately rounding the curve avoids isobars bunching up, relieving the otherwise severe adverse pressure gradients which would lead to premature separation and drag. It also allows the tip vortex to roll cleanly around the outer tip edge 28, to give the best hovering efficiency (by ensuring minimum induced power through the tip vortex rolling up as far outboard as possible, while incurring minimal viscous losses). To suit conditions on the advancing blade 14a, the tip region 20 is designed to alleviate shocks by thinning the cross-section of the blade 14a towards and over the tip region 20, and also employing a blend of aerofoil from 12% thickness at 87% R to 9.4% thickness at the tip station B-B at 94% R. The general sweep-back shape of the tip region 20, with perhaps some sweep of the tip edge 28, if necessary, is generally sufficient to avoid shock de-localisation beyond the tip region 20 for blades with low R/C ratios.

Another feature of the rotor blade 14a is the provision of anhedral at the tip region 20, which is only obvious in FIG. 4.

This anhedral favourably modifies the local blade 14a loading at the tip region 20, and improves the hover efficiency of the helicopter 10. The anhedral is formed by "bending" the blade chordal plane 34 at the tip region 20 towards the pressure surface 32 of the blade 14a, away from the suction surface 31. In the example such bending commences (spanwise) from the start of the tip region 20, at about 94% R at the tip station B-B, and continues to the tip edge 28. The amount of anhedral applied in the example is about −0.014C (the minus sign indicating downwards bending) which is a small amount, but in another example a greater or lesser degree of anhedral may be applied.

As mentioned above, in the example, as best seen in FIG. 3, in the planform view, the tip edge 28 as it approaches the outermost tip edge point 33, melds with an edge part 30 which is straight i.e. near streamwise or generally perpendicular to the blade longitudinal axis L. In another example the entire tip edge 28 may be curved from the beginning of the forwards leading corner 29, i.e. from the tip station B-B at the leading edge 25, to the outer tip edge 33.

In accordance with the invention, the actual (planform) shape of the tip edge 28 follows a, for example, cubic Bezier curve, which is drawn using in the example, four control points P1, P2, P3 and P4.

Figure 3:
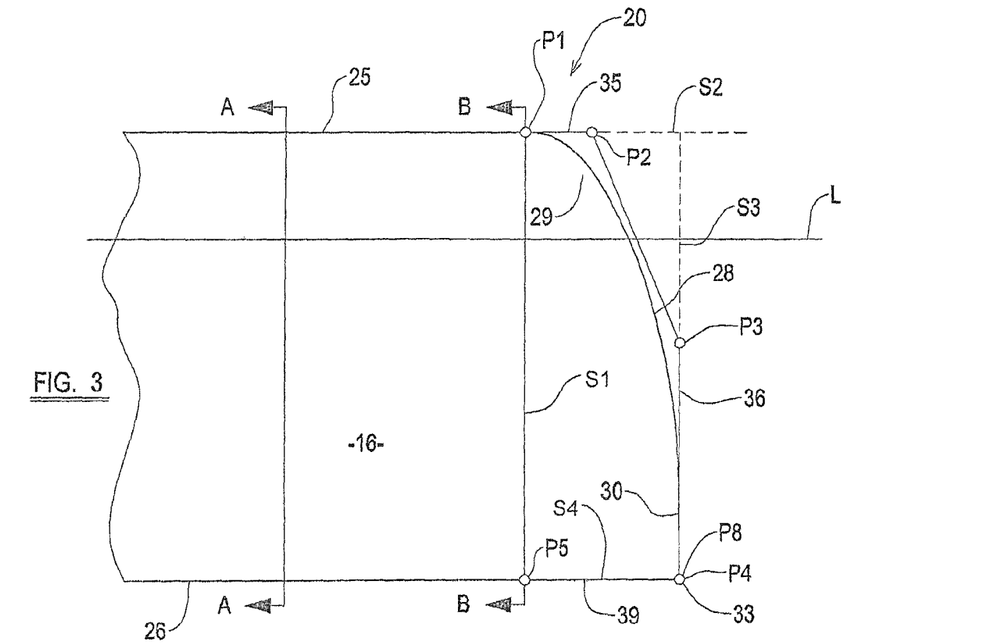
FIG. 3 is a more detailed planform view of part of a central portion, and the tip, of the rotor blade of FIG. 2.

It can be seen from FIG. 3 that the first control point P1 is located spanwise on the leading edge 25 of the aerofoil at the tip station B-B i.e. at the outer point of the leading edge 25 of the main portion 16 of the blade 14a, i.e. at the point along the leading edge 25 where the main portion 16 and the tip region 20 meet, e.g. at about 94% R in the example, and in the generality at between 93.5% R and 95.9% R, where R is the effective span of the aerofoil. In the example of the tail rotor aerofoil 14a shown in the drawings, the effective aerofoil span is the swept radius from an axis of rotation adjacent the root end 17, to the outermost tip edge point 33.

The line B-B at the tip station, where the tip region 20 and the main portion 16 of the aerofoil 14a meet, extends along a first side S1 of a virtual polygon which bounds the tip region 20, the first side S1 extending perpendicularly to the blade reference axis L. The boundary polygon in this example is a rectangle having a second side S2, a third side S3 and a fourth side S4, but in the generality the polygon may be four sided and typically a trapezium or trapezium-like shape, although only the first, second and third sides S1, S2, S3 of the polygon are required for locating the four control points P1-P4.

The second side S2 of the boundary polygon extends along a tangent to the leading edge 25 of the aerofoil at the first control point P1, in the example spanwise beyond the tip edge 28, to a position where the second side intersects the third polygon side S3. The third polygon side S3 is parallel to the first polygon side S1, and extends to a position where the third side S3 intersects the fourth polygon side S4. In the example, the fourth polygon side S4 is a tangent to the trailing edge 26 of the aerofoil 14a at a position where the first side S1 of the boundary polygon and the trailing edge 26 meet.

The second control point P2 is located along the second side S2 of the boundary polygon, and more specifically at a position between 30% and 80% of the distance along the second side from the first control point P1. Thus the second control point P2 is located beyond the tip edge 28 on the boundary polygon.

The third control point P3 is located along the third side S3 of the boundary polygon, and more specifically at a position between 30% and 90% of the distance along the third polygon side S3 from where the second S2 and third S3 sides meet.

The fourth control point P4 is located on the boundary polygon at the outermost tip edge point 33.

It will be appreciated that the during design of the aerofoil 14a, using a CAD/CAM system, the positions of at least the second and third control points P2 and P3 may readily be changed to achieve a particular aerofoil tip edge 28 configuration. In the example, the second control point P2 is shown at a position about 40% along the second side S2 of the boundary polygon from the first control point P1, whilst the third control point P3 is shown in the example at a position about 50% along the third side S3 of the virtual polygon. In the example, the second control point P2 is located outwardly spanwise at between 95.3% R and 98.8% R, and preferably, at about 98.035% R, and the third control point P3 is located outwardly spanwise of the tip edge 28, in this example, at about 99.0366% R.

By careful placement of the four Bezier control points P1, P2, P3 and P4, the tip edge 28 can be drawn as a smooth cubic Bezier curve with the desired tangency. If desired, a more complex Bezier curve may be constructed which would require extra control points.

In each case though the shape of the tip edge 28 will follow that of the Bezier curve constructed from the four or more control points P1 to P4.

Figure 2:
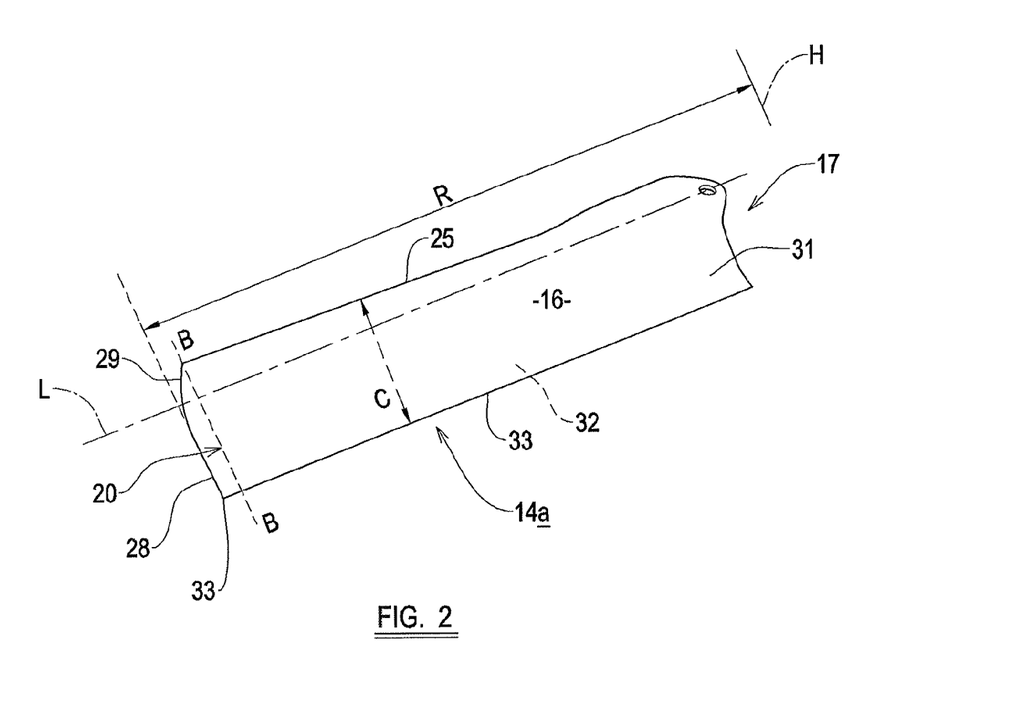
FIG. 2 is an illustrative perspective view of a rotor blade of the anti-torque tail rotor system of the helicopter of FIG. 1.

Although in the example of the FIGS. 2 and 3, the leading edge 25 of the main portion 16 of the aerofoil 14a extends straight to the tip region 20, in another example, as will be described below with reference to FIG. 7, there may be an intervening tip panel between the main portion 16 and the tip region 20, so that the leading edge at the tip station B-B where the tip region 20 begins, need not be such that the second side S2 of the virtual boundary polygon is parallel to the blade reference axis L, as in the example in FIG. 3.

In the example so far described, the outermost tip edge point 33 is located where the third and fourth boundary polygon sides S3 and S4 meet, this being the case because in the example, the trailing edge 26 of the tip region 20 is substantially straight. In another example, again as will be described below, and in the generality, the outermost tip edge point 33 will lie on the third side S3 of the boundary polygon, and control point P4 will be on the third polygon side S3 between P3 and the outermost tip edge point 33.

The trailing edge 39 configuration over the tip region 20 can also be designed to follow a Bezier curve drawn using control points.

In the example shown in FIG. 3 of the drawings, the trailing edge 39 over the tip region 20 is substantially straight, and can be drawn using two control points P5 and P8, each located on the fourth side S4 of the boundary polygon.

The straight trailing edge 39 over the tip region 20 thus follows what can be considered to be a special kind of Bezier curve. The trailing edge 39 over the tip region 20 need not be straight as shown but may be curved and follow a Bezier curve constructed from more than two control points P5, P8, e.g. three or four control points.

In the example though, the control point P5 is located spanwise of the blade 14a at between 93.5% R and 95.9% R e.g. preferably at the tip station B-B (at 94% R) on the trailing edge 39 where the first side S1 and the fourth side S4 of the boundary polygon meet. The control point P8 is in the example located at the outermost tip edge point 33 and thus the control point P8 in the example is located spanwise of the blade 14a substantially at 100% R, e.g. at 99.0366% R and where the third side S3 and the fourth side S4 of the boundary polygon meet. Thus in the example, where the trailing edge 39 over the tip region 20 is straight, i.e. generally parallel to the blade reference axis L, the fourth control point P4 for constructing the Bezier curve which the tip edge 28 follows, is coincident with the control point P8 for constructing the (special straight) Bezier curve for the trailing edge 39 over the tip region 20.

Although In the example, the fourth control point P4 and the control point P8 are coincident they need not be in another example.

The anhedral of the tip 20 region, in side view as per FIG. 4, may follow another Bezier curve, but in a vertical plane which is perpendicular to the chordal plane 34. FIG. 4 is a rear view of the tail rotor blade 14a of FIG. 3, the vertical plane in this example, where the trailing edge 39 over the tip region 20 is straight, being coincident with the trailing edge 26 of the main portion 16 of the aerofoil 14a and the trailing edge 39 over the tip region 20.

The anhedral commences in the example of FIG. 4, from the tip station B-B, at about 94% R.

The Bezier curve which the anhedral curve follows is in the example constructed from three anhedral control points P9, P10 and P12, although the Bezier curve may be constructed from four control points as will be described below.

In each case the anhedral control point P9 which is spanwise innermost, is located on the chordal plane 34 at the tip station B-B, and thus spanwise positionally is coincident with control points P1 and P5. The anhedral control point 12 which is spanwise outermost, is in the example located spanwise to be coincident with the outermost tip edge point 33, and thus with control points P4 and P8.

Figure 8A:
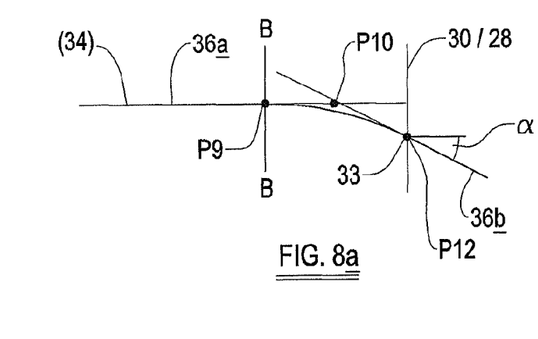
FIGS. 8a and 8b are alternative embodiments showing anhedral at the tip region of the blade of FIG. 7.

It will be appreciated that the degree of anhedral i.e. the positioning of the outermost tip edge point 33 below (in this example) the chordal plane 34, will be decided upon depending on design functional criteria of the aerofoil 14a. Referring to FIG. 8a, in general, the degree of anhedral, or anhedral angle α, is the angle between a first anhedral control point reference line 36a, which in this example is coincident with the chordal plane 34, and a second anhedral control point reference line 36b which passes though the outermost tip edge point 33 at spanwise outermost anhedral control point P12, and the chordal plane 34. Such a second anhedral control point reference line 36b subtend an anhedral angle α between 4° and 30° to the chordal plane 34, and preferably at an angle of between 4.4° and 25°.

The anhedral control point P10 intermediate the spanwise innermost P9 and spanwise outermost P12 anhedral control points is indicated in FIG. 8a to be where the first and second anhedral control point reference lines 36a, 36 cross, which in the present example is where the second anhedral control point reference line 36b crosses the chordal plane 34.

Using three such positioned control points P9, P10 and P12, a Bezier curve can be drawn which the is the curve followed by the anhedral.

Figure 8B:
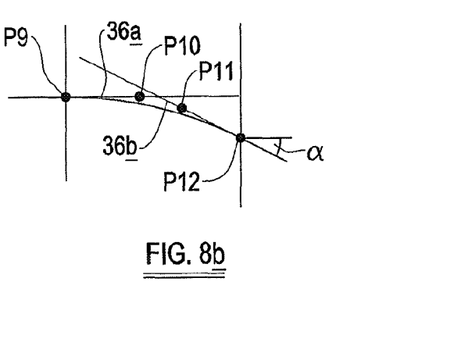

If it is desired the Bezier curve which the anhedral follows may be constructed from more than three control points, In the FIG. 8b example, four control points P9, P10, P11 and P12 are used, with the spanwise innermost and outermost control points P9, P12 being positioned as in the FIG. 8a example. However a first intermediate anhedral control point P10 is located on the first anhedral control point reference line 36a, whilst the second intermediate control point P11 is located on the second anhedral control point reference line 36b, and neither where the second anhedral control point reference line 36b intersects with the first anhedral control point reference line 36a.

Rather in this example, the first intermediate anhedral control point P10, is located along the first anhedral control point reference line 36a which is coincident with the chordal plane 34, at a position between 20% and 55% of the spanwise extent of the tip region 20 from the tip station B-B, and preferably about 33% of this spanwise extent. However the first intermediate anhedral control point P10 is preferably not located spanwise outwardly beyond where the first and second anhedral control point reference lines 36a, 36b intersect, The second intermediate control point P11 is located along the second anhedral control point reference line 36b which passes though the outermost tip edge point 33 at an anhedral angle of between 4° and 30°, and preferably between 4.4° and 25°, at a position between 55% and 90% of the spanwise extent of the tip region 20 from the tip station B-B, and preferably about 66% of this spanwise extent. However the second intermediate anhedral control point P11 is preferably not located spanwise inwardly beyond where the first and second anhedral control point reference lines 36a, 36b intersect.

Although in the examples described, the tail rotor aerofoil 14a is provided with twist about the blade reference axis L, this is not essential and the aerofoil 14a could be straight.

The placement of Bezier control points P1 to P12 as described above enables the tip region 20 configuration of an aerofoil uniquely to be designed. Moreover CAD software can readily be used to generate Bezier (or more precisely B-Spline or NURBS) surfaces from these control points P1 to P12 as described.

The use of Bezier control points to determine tip edge 28, trailing edge 39 (at the tip region 20) and anhedral configurations of the rotor blade 14a, using a 3D drafting software package, provides for the ready modifying or re-defining of the respective surfaces for optimisation of the tip region 20 configuration, by changing the positions of the various Bezier control points within the parameters defined by the claims of this application, thus facilitating the use of computational aerodynamic performance evaluation.

Figure 7:
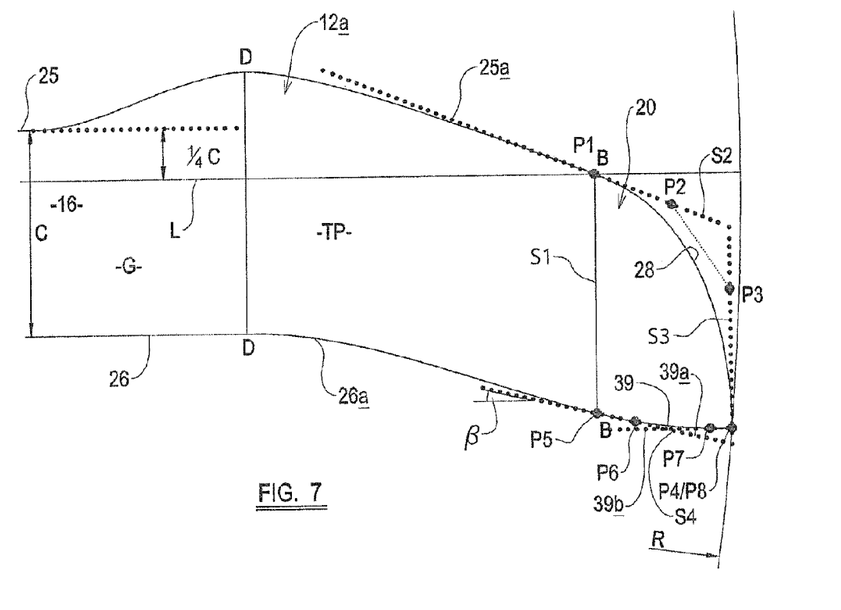
FIG. 7 is a planform view of part of an aerofoil rotor blade of the main sustaining rotor system of the helicopter of FIG. 1.

Referring to FIG. 7 an alternative aerofoil is illustrated which is one of the main rotor blades 12a-12d of the main sustaining rotor system 12 of the helicopter of FIG. 1, namely the main rotor blade 12a. This may or may not have twist around the blade reference axis L, as required.

Similar parts of the main rotor blade 12a to the tail rotor blade 14a already described are labelled with the same references. As main the rotor blade 12a is an aerofoil of a rotary system 12 (like tail rotor blade 14a of the previous figures), the effective aerofoil span R is the swept radius from the axis of rotation V to the outermost tip edge point 33.

The main rotor blade 12a of FIG. 7 has a main portion 16 which extends from the root end 17 towards a blade tip region 20, but unlike the tail rotor blade 14a previously described, the main rotor blade 12a has a tip panel TP between the main portion 16 of the blade 12a and the tip region 20. The tip panel TP extends spanwise outwardly from a tip panel station D-D at a position at about 85% R to 88% R, to the tip station B-B which as previously is located at about 94% R, and which more generally may be located at 93.5% R to 95.9% R.

The tip panel TP has a leading edge 25a which sweeps rearwardly from the tip panel station D-D to the tip station B-B, but the leading edge 25a of the tip panel TP at the tip panel station D-D is forwardly of the leading edge 25 of the main portion 16 of the main rotor blade 12a. In the example, the leading edge 25a at the tip station B-B is positioned rearwardly of the leading edge 25a at the tip panel station D-D.

This is achieved by providing a blend region G between the leading edge 25 of the main rotor blade 12a over the main portion 16 of the blade 12a, which extends over at least about 75% of the overall span of the main rotor blade 12a, and the leading edge 25a at the tip panel station D-D. Thus the blend region G extends from about 75% R to about 85% R to 88% R, and the leading edge at the blend region G, as well as part of the leading edge 25a of the tip panel TP, extending forwardly of the leading edge 25 over the main portion 16 of the blade 12a.

A trailing edge 26a of the tip panel TP extends rearwardly from the tip panel station D-D to the tip station B-B, but at least in the example, the trailing edge of the blend region G between the main portion 16 and tip panel station D-D of the blade is generally straight and corresponds to the trailing edge 26 over the main portion 16 of the blade 12a.

Of course, the invention may be applied to rotor blades with tip panels TP (or not) of varying dimensions to that shown. The shape of the curve which the leading edge of the blend region G and/or the leading edge 25a of the tip panel TP follows, could be constructed as one or more Bezier curves using control points, as could the curve which trailing edge 26a of the tip panel TP follows, although it is within the scope of the invention for these curves to be otherwise constructed.

In accordance with the present invention, the tip edge 28 of the tip region 20 follows a curve which is constructed as a Bezier curve from four control points P1, P2, P3 and P4 in the same way as is described above for the tip edge 28 of the tip region 20 of the tail rotor blade 14a. However in this example the boundary polygon on which the control points P1 to P4 lie is of a different configuration to the rectangle as is the case illustrated in FIG. 3 for example.

The boundary polygon bounding the tip region 20 of the main rotor blade 12a is again a trapezium and the first and third sides S1 and S3 are parallel and orthogonal to the blade reference axis L. The second and fourth sides S2 and S4 are in the example, parallel to each other but extend at a sweep angle β to the blade reference axis L, but in another embodiment, the second and fourth sides S2 and S4 need not be parallel.

The first control point P1 is located on the boundary polygon at the leading edge 25a at the tip station B-B, and control point P4 is located at the outmost tip edge point 33 of the main rotor blade 12a.

The first intermediate control point P2 is located along the second side S2 of the boundary polygon, between where the second side S2 intersects the first and third boundary polygon sides S1 and S3, at a position between 30% and 80% of the extent of the second side S2 from the first control point P1, The second boundary polygon side S2 is a tangent to the leading edge 25a at the first control point P1 at the tip station B-B.

The third control point P3 is located along the third side S3 of the boundary polygon between where the third side S3 intersects the second and fourth polygon sides, at a position between 30% and 90% of the extent of the third side from the intersection of the third S3 and second sides S2 of the boundary polygon.

Thus, as with the tip edge 28 of the tail rotor blade 14a, the tip edge 28 of the main rotor blade 12a is more easily designed using CAD/CAM systems to achieve a desired design functionality.

The trailing edge 39 of the tip region 20 of the main rotor blade 12a follows a Bezier curve which is constructed from two control points P5 and P8, located respectively innermost spanwise and outermost spanwise, and one or two intermediate control points P6 and P7. In FIG. 7, four control points P5 to P8 are used, with spanwise innermost control point P5 being located on the trailing edge 26a at the tip station B-B, and the spanwise outermost control point P8 being located at the outermost tip edge point 33.

A first intermediate control point P6 is located along a first trailing edge control point reference line 39a which is a tangent to the trailing edge 26a at the tip station B-B. More specifically the tangent is to the tip panel trailing edge 26a at the tip station B-B. This first trailing edge control point reference line 39a subtends an angle to the blade reference axis L which is the sweep angle β, In the example of FIG. 7, the first trailing edge control point reference line 39a is thus in congruity with the fourth side of the boundary polygon on which the control points P1 to P4 for constructing the first Bezier curve at the tip edge 28, are located.

The sweep angle β typically is up to 30° to the blade reference axis L. Of course in the example of the tail rotor blade 14a described with reference to FIG. 3, the sweep angle β is zero i.e. the trailing edge 39 at the tip region 20 subtends an angle of zero to the blade reference axis L. In the generality, the sweep angle β may be anything between zero and about 30°.

The sweep angle β of the leading and trailing edges of the tip region 20 may be different in order to accommodate tapering of the tip panel.

The control point P6 is preferably located at between 10% and 33% of the spanwise extent of the tip region 20 from the tip station B-B, but not spanwise outwardly beyond where the first trailing edge control point reference line 39a intersects with a second trailing edge control point reference line 39b along which control point P7 is located.

The second trailing edge control point reference line 39b passes through the outermost tip edge point 33, and hence control point P8, and subtends an angle to the blade reference axis L which is between zero and the sweep angle β or more generally, an angle between zero and 1.5 times the sweep angle β. The second intermediate control point P7 is located along the second trailing edge control point reference line 39b at a position between 66% and 90% of the spanwise extent of the tip region 20 from the tip station B-B, but not spanwise inwardly beyond the intersection with the first trailing edge control point reference line 36a.

Figure 9A:
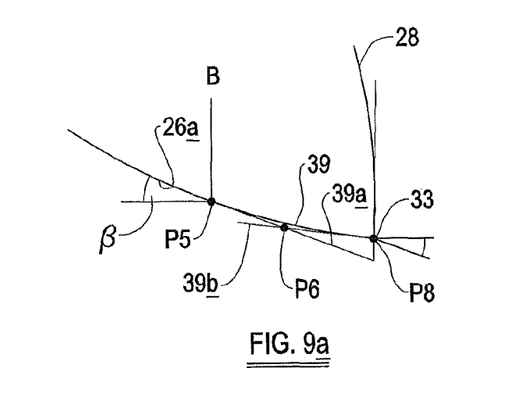
FIGS. 9a to 9d illustrate alternative trailing edges of an aerofoil in accordance with the present invention.
Figure 9B:
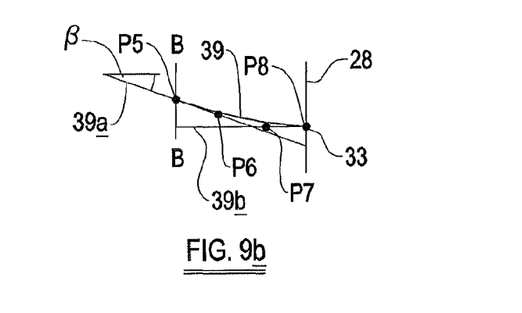
Figure 9C:
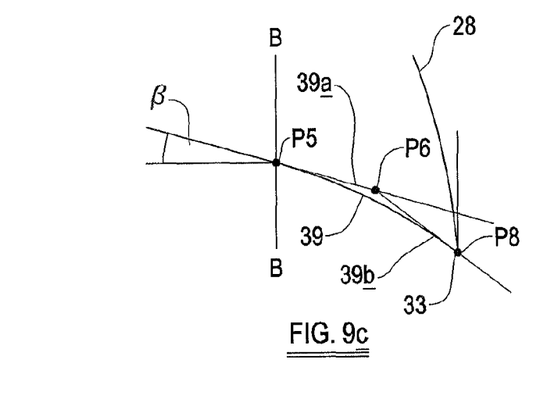
Figure 9D:
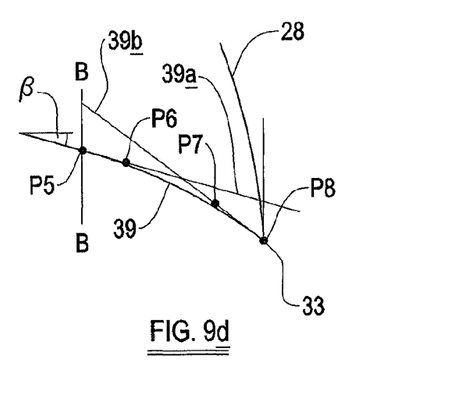

FIGS. 9b and 9d illustrate alternative trailing edge 39 configurations which will vary according to the position of the outermost trailing edge point 33, and thus the position of the control point P8, and the positioning of the intermediate control points P6 and P7 along their respective trailing edge control point reference lines 39a, 39b. FIGS. 9a and 9c illustrate alternative trailing edge 39 configurations where only one intermediate control point P6 is used to construct the Bezier curve followed by the trailing edge 39.

In FIG. 9a it can be seen that the (single) intermediate control point P6 is located at the intersection of the two trailing edge control point reference lines 39a, 39b. In this example the trailing edge 26a of the adjacent tip panel TP is curved, and the outermost tip edge point 33 is positioned, such that the tangent at the tip station B-B i.e. the first trailing edge control point reference line 39a crosses the second trailing edge control point reference line 39b at a position chordwise outwardly rearwardly of the Bezier curve which is constructed using those three control points P5, P6 and P8.

Contrasting this with the configuration shown in FIG. 9c, in this arrangement the outermost tip edge point 33 is positioned chordwise further outwardly rearwardly, although the curve of the adjacent trailing edge 26a of the tip panel TP is similar to in FIG. 9a. However as a result the first and second trailing edge control point reference lines 39a, 39 intersect at a position which is chordwise inwardly of the Bezier curve which is constructed using the three control points P5, P6 and P8. It can be seen in FIG. 9c that the trailing edge of the aerofoil thus curves in one sense over the trailing edge 26a of the tip panel TP, and reverses its direction of curve over trailing edge 39 over the tip region 20.

In FIG. 9b, again the intersection of the first and second trailing edge control point reference lines 39a, 39b is chordwise outwardly rearwardly of the Bezier curve constructed using the four control points P5, P6 P7 and P8, whereas in FIG. 9d, the intersection is, as in the case illustrated in FIG. 9c, chordwise inwardly of the Bezier curve which is constructed using the four control points P5 to P8.

In the case of the second Bezier curve which the trailing edge 39 over the tip region 20 follows being a cubic Bezier curve constructed from four control points, if desired the first intermediate trailing edge Bezier control point P6 may be located spanwise of the blade 12a at between 94.6% R and 96.5% R e.g. at 95.44% R, and the second intermediate trailing edge Bezier control point P7 may be located spanwise of the blade 14a at between 96.5% R and 98.4% R e.g. at 97.47% R.

The main rotor blade 12a described in relation to FIG. 7 may have anhedral over the tip region 20, which follows a curve in a vertical plane, in exactly the same manner as is described in relation to the anhedral of the tail rotor blade 14a described above. Thus the illustration of FIG. 8a which indicates how the anhedral curve may follow a Bezier curve constructed from three control points P9, P10 and P12 is applicable to providing anhedral to the main rotor blade 12a, as is the alternative configuration of FIG. 8b.

In this latter arrangement, the anhedral curve of the main blade 12a follows a further Bezier curve constructed using four anhedral control points P9, P10, P11, P12 rather than the three of FIG. 8a.

The spanwise innermost anhedral control point P8 is located where the chordal plane 34 crosses the tip station B-B, and the spanwise outermost control point P12 is located at the outermost tip edge point 33 the position of which is decided as a matter of fundamental blade design.

From the above it will be appreciated that a range of aerofoils may be produced with tip edges of varying configuration depending up the selected positioning of the respective four control points, but that in each case, the tip edge shape will follow the first Bezier curve.

Preferably, the trailing edge 39 over the tip region 20, and/or anhedral shape may be configured to follow respective second and/or further Bezier curves although a range of different trailing edge and/or anhedral configurations may be achieved by following Bezier curves. Moreover the invention may be applied to a tail rotor, a main rotor aerofoil and indeed to a wide variety of other aerofoils which may be fixed aerofoils, i.e. fixed relative to a supporting structure such as an aircraft fuselage, and aerofoils which are supported by a rotating system, such as rotor aerofoils, turbines and the like.

A computational evaluation of the exemplary rotor blades 14a and 12a described in this application indicates that this blade 14a, 12a configurations offer significant benefits over known rotor blades, in terms of hover efficiency (of the helicopter 10 to which the rotor blades 14a, 12a are fitted) and in delaying power rise at the onset of stall.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. An aerofoil having a main portion of aerofoil cross section, an inner spanwise root end where the aerofoil is in use secured to a supporting structure, and at an outermost spanwise end outboard of the main portion, beyond a tip station, a tip region, and the tip region including a tip edge, a planform configuration of the tip edge following a first Bezier curve constructed from at least four control points P1, P2, P3 and P4, the control points P1, P2, P3 and P4 each following a periphery of a polygon which bounds the tip region, Bezier control point P1 being located on a leading edge of the aerofoil at the tip station, which is at a spanwise position between 93.5% R and 95.9% R, where first and second sides of the polygon meet, the first side being at the tip station extending perpendicularly to a blade reference axis, which extends spanwise of the main portion of the aerofoil, and the second side being a tangent to the leading edge of the aerofoil at control point P1, which extends between control point P1 to a position where the second side meets a third side of the boundary polygon at a position outwardly of the tip edge, the third side being parallel to the first side and extending between the position where the third side meets the second side, to where the third side and a fourth side meet, control point P2 being located on the second side at a position between 30% and 80% along the second side from P1, control point P3 being located on the third side at a position between 30% and 90% along the third side from where the second and third sides meet, and control point P4 being located at an outermost tip edge point at a trailing edge of the aerofoil, where R is the effective aerofoil span.

2. An aerofoil according to claim 1 wherein the Bezier curve on which the planform configuration of the tip edge of the tip region lies, is a cubic Bezier curve.

3. An aerofoil according to claim 1 wherein the boundary polygon is one of a rectangle, a parallelogram or trapezium.

4. An aerofoil according to claim 3 wherein the fourth side of the boundary polygon is a tangent to a trailing edge of the aerofoil where the first side meets the trailing edge, and the fourth side extending between where the first side meets the trailing edge and the fourth side meets the third side.

5. An aerofoil according to claim 1 wherein the outermost tip edge point lies on the third side.

6. An aerofoil according to claim 5 wherein the outermost tip edge point lies on the third side where the third side meets the fourth side.

7. An aerofoil according to claim 5 wherein the outermost tip edge point lies on the third side between control point P3 and where the third and fourth sides of the boundary polygon meet.

8. An aerofoil according to claim 1 wherein the tip edge of the aerofoil has a rounded leading edge corner which extends to an edge part which extends substantially streamwise, so that the tip edge is of a swept back configuration from the control point P1.

9. An aerofoil according to claim 1 wherein the planform configuration of the trailing edge of the aerofoil at the tip region lies on a second Bezier curve constructed from at least two further control points P5, and P8, control point P5 being located where the first side of the boundary polygon meets the trailing edge, and control point P8 being located at the outermost tip edge point.

10. An aerofoil according to claim 9 wherein the second Bezier curve between the control points P5 and P8 is a straight line which extends generally parallel to the blade reference axis.

11. An aerofoil according to claim 9 wherein the second Bezier curve is constructed from three control points P5, P6 and P8, the control point P6 being located at an intersection of first and second trailing edge control point reference lines, the first trailing edge control point reference line being a tangent to the trailing edge inboard of the tip station, at control point P5, the first trailing edge control point reference line extending at a sweep angle to the blade reference axis, and the second trailing edge control point reference line being a line which passes through control point P8 at the outermost tip edge point and extends at an angle to the blade reference axis which is between zero and 1.5 times the sweep angle.

12. An aerofoil according to claim 11 wherein the second trailing edge control point reference line extends at an angle to the blade reference axis which is between zero and the sweep angle.

13. An aerofoil according to claim 11 wherein the sweep angle is between zero and 30°.

14. An aerofoil according to claim 9 wherein the second Bezier curve is constructed from four control points P5, P6, P7 and P8, the control point P6 being located along a first trailing edge control point reference line which is a tangent to the trailing edge inboard of the tip station, at control point P5, the first trailing edge control point reference line extending at a sweep angle to the blade reference axis, and the control point P7 is located along a second trailing edge control point reference line being a line which passes though point P8 at the outermost tip edge point and extends at an angle to the blade reference axis which is between zero and 1.5 times the sweep angle.

15. An aerofoil according to claim 14 wherein the control point P6 is located along the first trailing edge control point reference line at a position between 10% and 33% of the spanwise extent of the tip region from control point P5 but not spanwise outwardly of the intersection of the first and second trailing edge control point reference lines, and the control point P7 is located along the second trailing edge control point reference line at a position between 66% and 90% of the spanwise extent of the tip region from control point P5 but not spanwise inwardly of the intersection of the first and second trailing edge control point reference lines.

16. An aerofoil according to claim 14 wherein the second Bezier curve on which the trailing edge of the aerofoil at the tip region lies, is a cubic Bezier curve.

17. An aerofoil according to claim 1 wherein the tip region has anhedral.

18. An aerofoil according to claim 17 wherein the aerofoil has a chordal plane which extends over the aerofoil between the leading edge and the trailing edge over the main portion of the aerofoil, and the anhedral follows a curve in a vertical plane which is perpendicular to the chordal plane, the curve being between pressure and suction surfaces of the aerofoil over the tip region, and the curve being a third Bezier curve constructed from at least three control points P9, P10, and P12 in the vertical plane, and wherein control point P9 is located spanwise of the aerofoil at the tip station, and on the chordal plane, control point P12 is located at the outermost tip edge point, and control point P10 being located at an intersection of first and second anhedral control point reference lines, the first anhedral control point reference line being coincident with the chordal plane, and the second anhedral control point reference line passing through control point P12 and extending at a tip anhedral angle to the chordal plane, at between 4° and 30°.

19. An aerofoil according to claim 17 wherein the aerofoil has a chordal plane which extends over the aerofoil between the leading edge and the trailing edge over the main portion of the aerofoil, and the anhedral follows a curve in a vertical plane which is perpendicular to the chordal plane, the curve being between pressure and suction surfaces of the aerofoil over the tip region, and the curve being a third Bezier curve constructed from at least four control points P9, P10, P11 and P12 in the vertical plane, and wherein control point P9 is located spanwise of the aerofoil at the tip station, and on the chordal plane, control point P12 is located at the outermost tip edge, and first intermediate control point P10 being located along a first anhedral control point reference line which is coincident with the chordal plane, and second intermediate control point P11 being located on a second anhedral control point reference line which passes through control point P12 and extends at a tip anhedral angle to the chordal plane, at between 4° and 30°.

20. An aerofoil according to claim 19 wherein the first intermediate control point P10 is located along the first anhedral control point reference line at a position between 20% and 55% of the spanwise extent of the tip region from control point P9, but not spanwise outwardly of the intersection of the first and second anhedral control point reference lines, and the second intermediate control point P11 is located along the second anhedral control point reference line at a position between 55% and 90% of the spanwise extent of the tip region from control point P9 but not spanwise inwardly of the intersection of the first and second anhedral control point reference lines.

21. An aerofoil according to claim 20 wherein the first intermediate control point P10 is located along the first anhedral control point reference line at a position at about 33% of the spanwise extent of the tip region from control point P9, and the second intermediate control point P11 is located along the second anhedral control point reference line at a position at about 66% of the spanwise extent of the tip region from control point P9.

22. An aerofoil according to claim 19 wherein the second anhedral control point reference line which passes through control point P12, extends at a tip anhedral angle to the chordal plane, at between 4.4° and 25°.

23. An aerofoil according to claim 1 in which the main portion of the aerofoil extends from the supporting structure spanwise for at least 75% of the overall aerofoil effective span.

24. A aerofoil according to claim 1 wherein the blade reference axis extends spanwise of the main portion of the aerofoil mid the mean thickness of the main portion of the aerofoil, and at least the main portion of the aerofoil has a twist of between 0° and 16° therealong, about the blade reference axis.

25. An aerofoil according to claim 1 wherein the aerofoil is secured at the root end to a rotating supporting structure.

26. An aerofoil according to claim 1 wherein the aerofoil includes a tip panel located between the main portion of the aerofoil and the tip region, the tip panel extending outwardly spanwise from a tip panel station at between 85% R and 88% R to the tip station.

27. An aerofoil according to claim 26 wherein the blade reference axis is located at 0.25C where C is the chord length of the main portion of the aerofoil, and wherein the tip panel has a leading edge which sweeps rearwardly from the tip panel station to the tip station, the leading edge of the aerofoil at the tip station being located at or rearwardly of where the blade reference axis intersects the leading edge.

28. An aerofoil according to claim 26 wherein between the tip panel and the main portion of the aerofoil there is a blend region at which leading and trailing edges of the main portion blend with respective leading and trailing edges of the tip panel, the blend region extending outwardly spanwise from a blend region station at about 75% R to the tip panel station.

29. An aerofoil according to claim 28 wherein at least portions of the leading edges of each of the blend region and the tip panel extend forwardly of the leading edge of the main portion of the aerofoil.

30. An aerofoil according to claim 28 wherein at least portions of the leading edges of each of the blend region and tip panel lie on one or more Bezier curves constructed from control points.

31. A method of providing an aerofoil which includes a main portion of aerofoil cross section, an inner spanwise root end where the aerofoil is in use secured to a supporting structure, and at an outermost spanwise end outboard of the main portion, beyond a tip station, a tip region, and the tip region including a tip edge, a planform configuration of the tip edge following a first Bezier curve constructed from at least four control points P1, P2, P3 and P4, the control points P1, P2, P3 and P4 each following a periphery of a polygon which bounds the tip region, Bezier control point P1 being located on a leading edge of the aerofoil at the tip station, which is at a spanwise position between 93.5% R and 95.9% R, where first and second sides of the polygon meet, the first side being at the tip station extending perpendicularly to a reference axis which extends spanwise of the main portion of the aerofoil, and the second side being a tangent to the leading edge of the aerofoil at control point P1, which extends between control point P1 to a position where the second side meets a third side of the boundary polygon at a position outwardly of the tip edge, the third side being parallel to the first side and extending between the position where the third side meets the second side, to where the third side and a fourth side meet, control point P2 being located on the second side at a position between 30% and 80% along the second side from P1, control point P3 being located on the third side at a position between 30% and 90% along the third side from P2, and control point P4 being located at the outermost tip edge point at a trailing edge of the aerofoil, where R is the effective aerofoil span, the method including shaping the planform configuration of the tip edge to follow the first Bezier curve.

* * * * *